(12) United States Patent
Neau et al.

(10) Patent No.: US 12,357,078 B2
(45) Date of Patent: Jul. 15, 2025

(54) MOUNTING APPARATUS FOR A HOLSTER

(71) Applicant: MOTOROLA SOLUTIONS, INC., Chicago, IL (US)

(72) Inventors: Michael Neau, Pleasant Prairie, WI (US); Ryan M Nilsen, Plantation, FL (US); Goktug Duman, Miami, FL (US); Mohd Hizami Abdul Hamid, Seberang Jaya (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 219 days.

(21) Appl. No.: 18/364,147

(22) Filed: Aug. 2, 2023

(65) Prior Publication Data

US 2025/0040689 A1 Feb. 6, 2025

(51) Int. Cl.
*A45F 5/02* (2006.01)
*A45F 5/00* (2006.01)
*H04B 1/3888* (2015.01)

(52) U.S. Cl.
CPC ........ *A45F 5/021* (2013.01); *A45F 2005/025* (2013.01); *A45F 5/1516* (2025.01); *H04B 1/3888* (2013.01)

(58) Field of Classification Search
CPC .......... A45F 2005/026; A45F 2005/025; A45F 5/021; A45F 5/02; A45C 11/002; H04B 1/3888
See application file for complete search history.

(56) References Cited

U.S. PATENT DOCUMENTS

| | | | |
|---|---|---|---|
| 3,878,589 A * | 4/1975 | Schaefer | A45F 5/021 24/669 |
| 4,504,001 A * | 3/1985 | Nichols | F41C 33/0227 224/198 |
| 5,604,958 A * | 2/1997 | Anscher | A45C 7/0086 24/165 |
| 6,752,299 B2 * | 6/2004 | Shetler | F41C 33/045 24/3.11 |
| 8,141,210 B2 * | 3/2012 | Colorado | A45F 5/02 24/3.12 |
| 8,306,582 B2 | 11/2012 | Williams et al. | |
| 8,333,310 B2 | 12/2012 | Tages | |
| 10,820,683 B1 | 11/2020 | Tran et al. | |
| 2006/0186152 A1 * | 8/2006 | Williams | A45F 5/02 224/269 |
| 2010/0124957 A1 | 5/2010 | Williams et al. | |
| 2017/0122701 A1 | 5/2017 | Lim et al. | |

FOREIGN PATENT DOCUMENTS

| | | |
|---|---|---|
| DE | 202020100828 U1 | 5/2021 |
| DE | 202020100829 U1 | 5/2021 |
| GB | 2575650 B1 | 7/2020 |
| JP | 246208 H1 | 9/1998 |
| KR | 100541188 B1 | 1/2006 |
| KR | 200412377 Y1 | 3/2006 |
| KR | 200457977 Y1 | 1/2012 |

* cited by examiner

Primary Examiner — Adam J Waggenspack
(74) Attorney, Agent, or Firm — Barbara R Doutre

(57) ABSTRACT

The present invention relates to a mounting apparatus and a holster having a bracket with a D-stud with a radial pattern of detent pockets. The D-stud allows the bracket to rotate in a ratcheting manner in a first range of motion and freely rotate in a second range of motion. The free rotation of the second range of motion allows the D-stud to automatically recover from a vertical position to a non-vertical position.

22 Claims, 14 Drawing Sheets

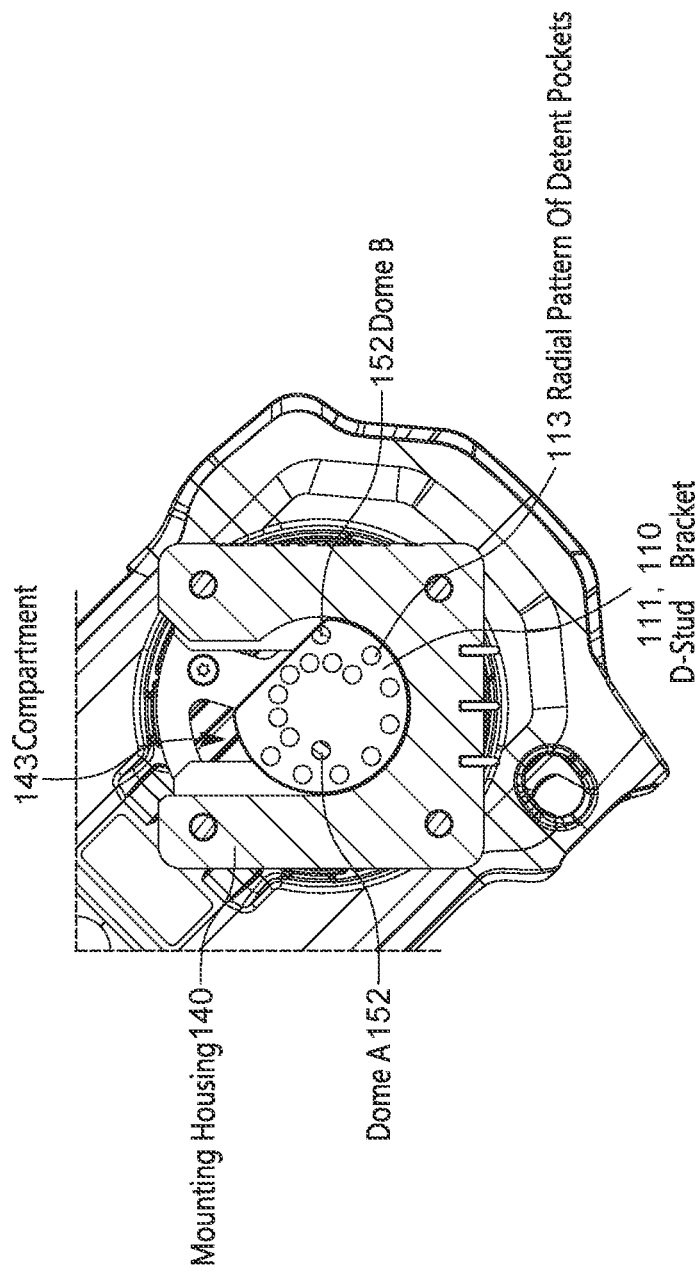

MOUNTING APPARATUS FOR A HOLSTER

BACKGROUND

Body worn communication devices are often worn by public safety personnel, such as police officers, firefighters, and paramedics. Such devices may include, but are not limited to, portable radios, body cameras, remote speaker microphones and/or other communication equipment that may be attached and detached to/from the user's clothing, such as via a belt clip or other attachment mechanism. Managing the attachment and detachment of such devices can be challenging when working within a public safety environment, where the wearer may transition from sitting in a vehicle or at a desk, to walking, running, or climbing on structures. It is important that the attachment interface allow for simple attachment and release of the communication while providing secure and comfortable retention that does not limit mobility of the user. It is important that the communication device not become dislodged or detached, particularly during an emergency situation. Hence, design approaches should take into account versatility of motion, comfort, ease of use and accessibility to the communication device, as well as secure attachment.

Accordingly, there is a need for an improved attachment mechanism for a portable communication device.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 7B is a rear view of a cross-section of the mounting apparatus with the D-stud rotated in accordance with some embodiments.

Figure 1:
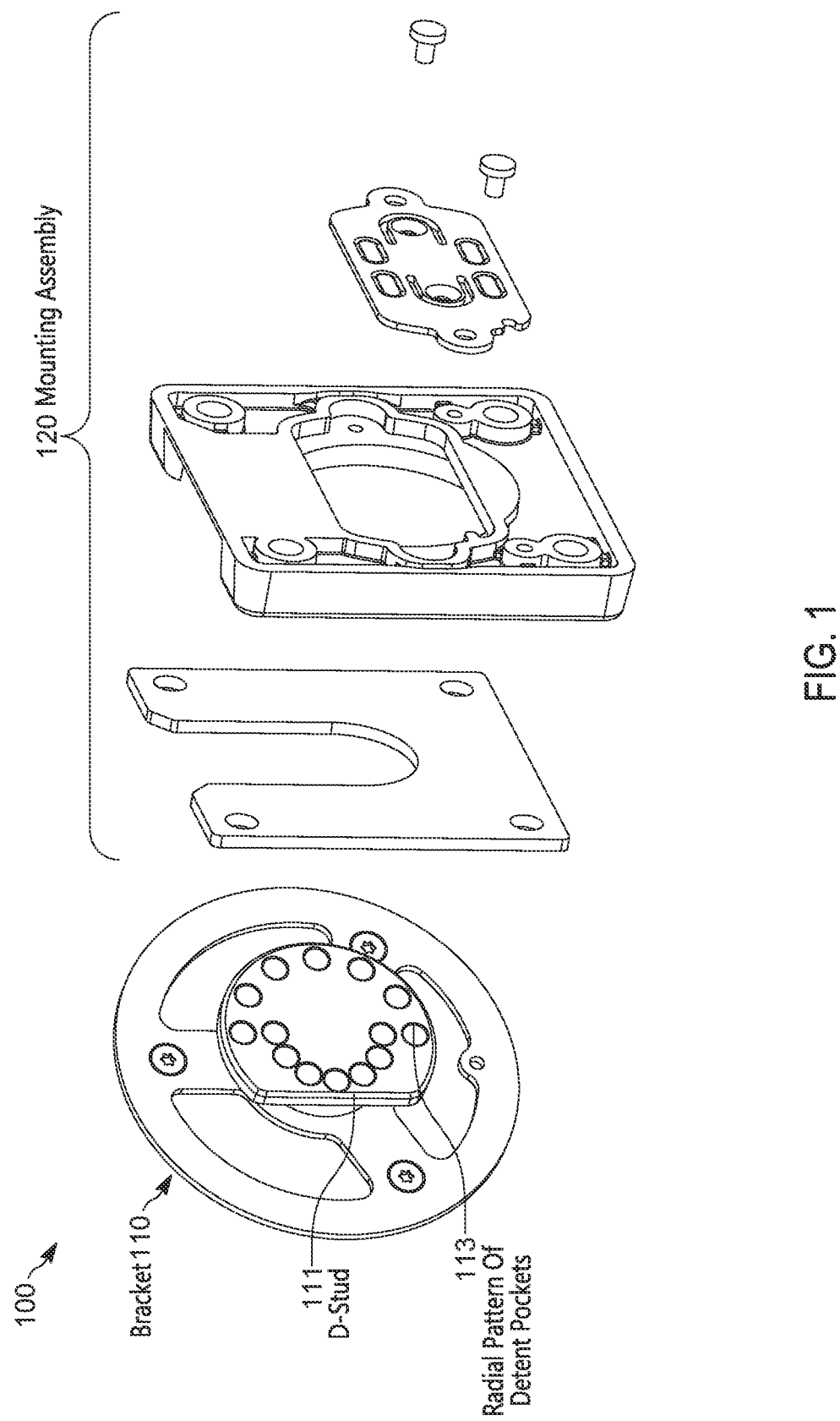
FIG. 1 is an exploded view of a mounting apparatus in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Managing the position of a holstered radio is a difficult. If the holstered radio is allowed to freely rotate 360 degrees, the holstered radio will have a less secure connection with the wearer. If the holstered radio is not allowed to rotate, the wearer may face some discomfort while they are in a sitting position. Thus, there exists a need for an improved technical device and system for a mounting apparatus for a holster. Public safety personnel, such as those working in law enforcement, will benefit from a holstered radio that offers mobility, comfort, safety, and accessibility while worn is various positions, such as sitting and standing positions.

In accordance with one example embodiments, a mounting apparatus for a portable communication device, the mounting apparatus comprising: a bracket mounted to a radio holster, the bracket comprising: a D-stud extending therefrom, the D-stud having a radial pattern of a first half-ring of detent pockets and a second half-ring of detent pockets, the first half-ring having a larger radius than the second half-ring and sharing a center point with the second half-ring, the first half-ring having a first end and a second end, and the second half-ring having a first end and a second end, the first end of the first half-ring overlapping with the first end of the second half-ring, the second end of the first half-ring overlapping with the second end of the second half-ring, wherein the first half-ring has an opening that faces an opening of the second half ring; and a mounting assembly configured to receive the bracket, the mounting assembly comprising: a front plate having cutout, such as a u-shaped cutout, for receiving the D-stud; a mounting housing having an aperture; a spring plate mounted within the aperture of the mounting housing, the spring plate comprising: a pair of connected cantilever arms compressibly coupled with the spring plate, each arm having a dome, the pair of connected cantilever arms positioned such that at least one dome is alignable with a detent pocket of the first half-ring and another dome is alignable with a detent pocket with the second half ring, wherein the bracket is rotatable within the mounting assembly, and wherein the D-stud rotates in a first range of motion when domes and detent pockets are aligned, and the D-stud rotates in a second range of motion when the domes and detent pockets are misaligned providing auto-recovery, wherein the pair of connected cantilever arms is configured to engage the domes with the radial pattern of detent pockets.

In accordance with another example embodiment, A holster, comprising: a holster housing; and a bracket secured to the holster housing, the bracket having a D-stud extending therefrom, the D-stud having a radial pattern of a first half-ring of detents and a second half-ring of detents, the first half-ring having a larger radius than the second half-ring and sharing a center point with the second half-ring, the first half-ring having a first end and a second end, and the second half-ring having a first end and a second end, the first end of the first half-ring overlapping with the first end of the second half-ring, the second end of the first half-ring overlapping with the second end of the second half-ring, wherein the first half-ring has an opening that faces an opening of the second half ring.

Each of the above-mentioned embodiments will be discussed in more detail below, starting with example system and device architectures of the system in which the embodiments may be practiced, followed by an illustration of processing blocks for achieving an improved technical method, device, and system for a mounting apparatus for a holster.

Further advantages and features consistent with this disclosure will be set forth in the following detailed description, with reference to the figures.

Referring now to the drawings, and in particular FIG. 1, there is shown a mounting apparatus 100 in accordance with some embodiments. The mounting apparatus 100 comprises a bracket 110 with D-stud 111 extending therefrom, and a mounting assembly 120. As will be shown in later views, the D-stud 111 has a radial pattern of detent pockets 113. As will be shown in later views, the bracket 110 may be secured to a holster, such as a holster for a portable communication device. As will be shown in later views, the mounting assembly 120 may be attached to an article of clothing. The mounting assembly 120 is configured to receive the D-stud 111. In accordance with some embodiments and as will be further described in later views, the mounting apparatus 100 enables a holstered portable communication device to freely rotate in one range of motion and rotate in a ratcheting manner in another one range of motion.

Figure 2A:
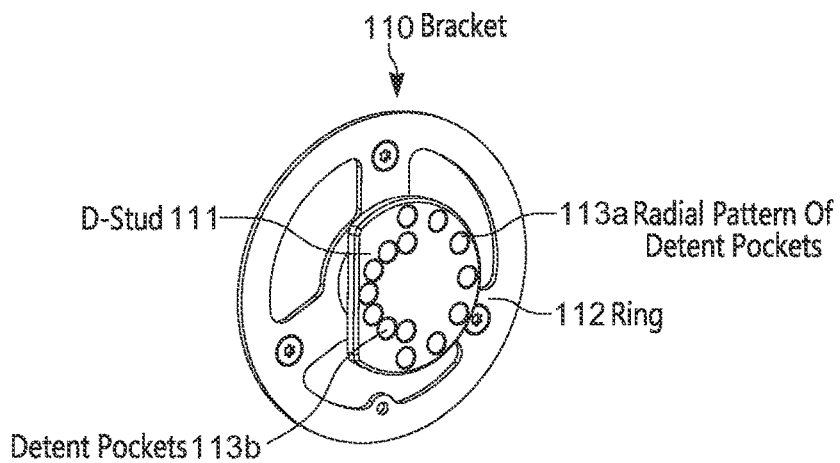
FIG. 2A is a perspective view of a bracket of the mounting apparatus of FIG. 1 in accordance with some embodiments.
Figure 2B:
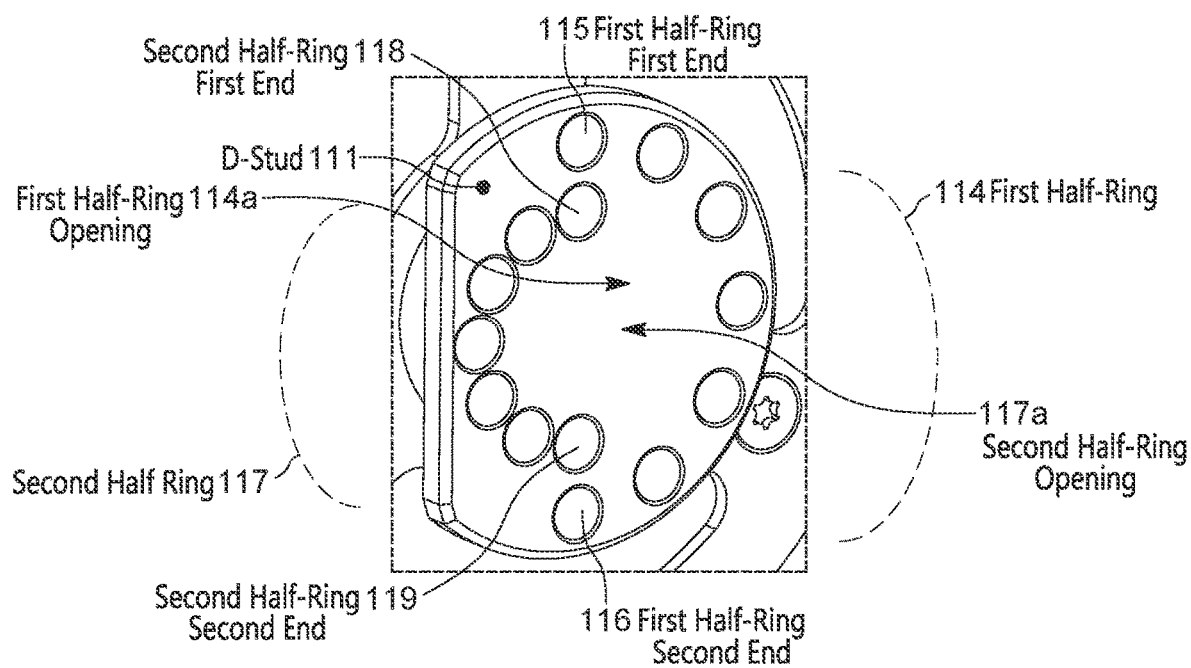
FIG. 2B is a magnified view of the D-stud of the mounting apparatus of FIG. in accordance with some embodiments.

Referring now to FIGS. 2A-B, in one embodiment, the bracket 110 with D-stud extending therefrom are preferably formed of a unitary metal piece part. The bracket 110 may be formed, for example, of a metal ring 112 suitable for mounting to a holster (shown in other views) with metal D-stud 111 extending therefrom. A face of the D-stud 111 may be formed as a solid center. In accordance with the embodiments, the face of the D-stud 111 has a radial pattern of detent pockets 113. Each individual detent pocket 113 may be identical in size. The radial pattern of detent pockets 113 is made up of a first half-ring of detent pockets 114 and a second half-ring of detent pockets 117. The first half-ring of detent pockets 114 is positioned to have its opening 114a face opening 117a of the second half-ring of detent pockets 117. Opening 114a of the first half-ring may also be referred to as first half ring opening and opening 117a of the second half ring may also be referred to as second half-ring opening. The first half-ring of detent pockets 114 shares a center point with the second half-ring of detent pockets 117. The first half-ring of detent pockets 114 has a larger radius than the second half-ring of detent pockets 117. The difference in radii between the two half-rings 114, 117 allows the mounting assembly 120 to disengage the radial pattern of detent pockets 113. The first half-ring of detent pockets 114 is positioned such that the first end 115 and the second end 116 of the first half-ring of detent pockets 114 respectively overlaps with the first end 118 and second end 119 of the second half-ring of detent pockets 117. More specifically, the ends of the first half-ring of detent pockets 114 are adjacent to the second half-ring of detent pockets 117.

In some embodiments, the first half-ring of detent pockets 114 may be positioned along a round edge of the D-stud 111 and the second half-ring of detent pockets 117 may be positioned proximal to a straight edge of the D-stud 111. (Designator numerals are called out later in FIGS. 5A and 5B to refer to a straight edge 111a of the D-stud 111 and a round edge 111b of the D-stud 111).

Figure 3:
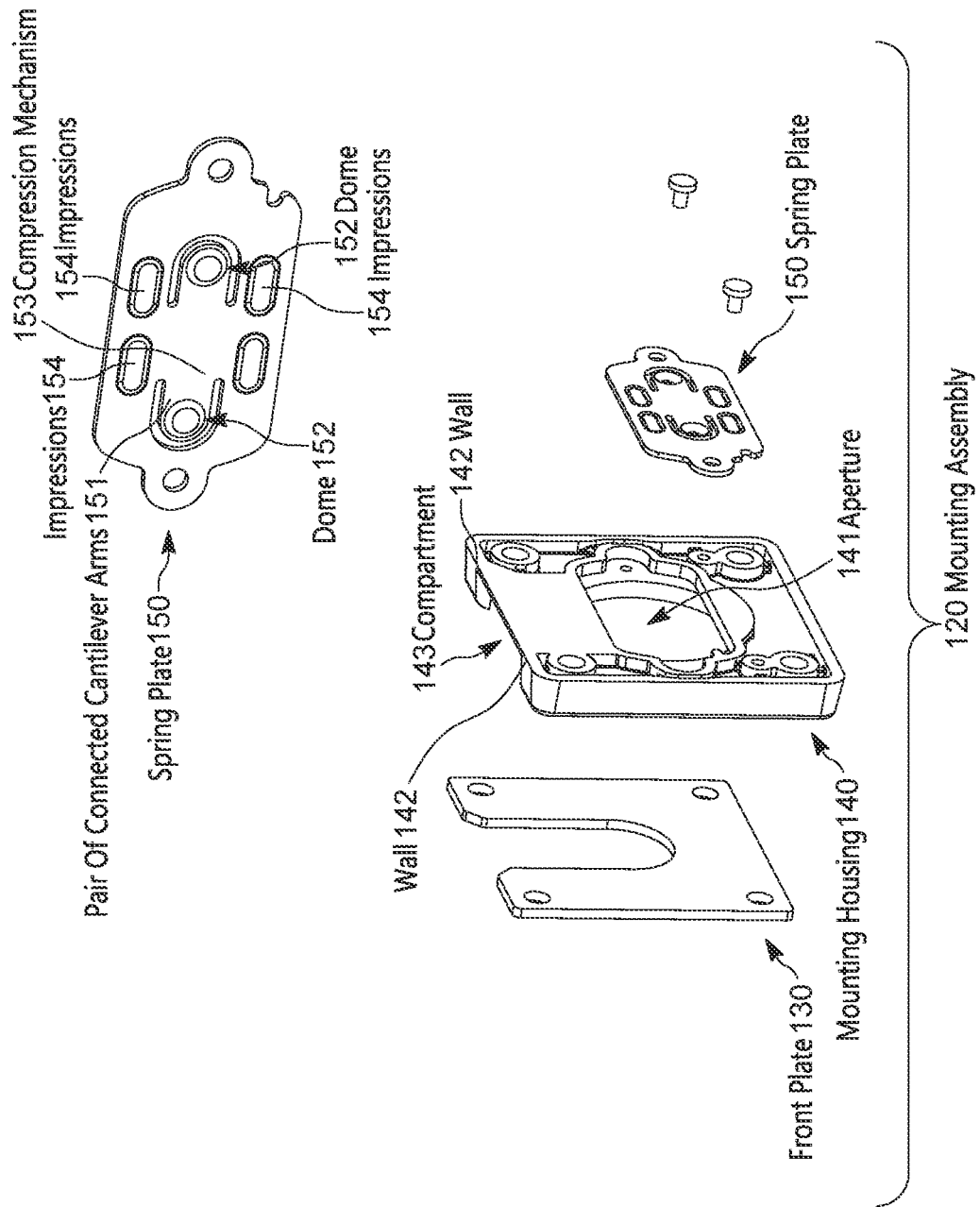
FIG. 3 is an exploded view of the mounting assembly of the mounting apparatus in accordance with some embodiments.

Referring now to FIG. 3, the mounting assembly 120 comprises a front plate 130 having a u-shaped cutout for receiving the D-stud 111, a mounting housing 140 having an aperture 141, and a spring plate 150 mounted within the aperture 141 of the mounting housing 140. The front plate 130 may be attached to the walls 142 of the mounting housing to form a compartment 143 to receive the D-stud 111. The front plate 130 and the spring plate 150 may be attached to opposite sides of the mounting housing 140. The mounting housing 140 may be made of plastic and the front plate 130 may be made of metal.

The spring plate 150 allows the mounting assembly 120 to engage the bracket 110 after the D-stud 111 moves through the u-shaped cutout of the front plate 130 and into the compartment 143 of the mounting housing 140. The spring plate 150 engages the bracket 110 by engaging the radial pattern of detent pockets 113 when the D-stud 111 is in compartment 143. In some embodiments, the spring plate 150 may be made of the same material as the D-stud 111. For example, both the spring plate 150 and the D-stud 111 are made of metal. The spring plate 150 comprises a pair of connected cantilever arms 151 compressibly coupled with the spring plate. Each arm 151 has a dome 152 and each arm 151 may be equal in length. In some embodiments, each dome 152 is positioned at a distal end of each arm 151. The pair of connected cantilever arms 151 is positioned such that at least one dome 152 is alignable with a detent pocket of first half-ring of detent pockets 114 and the other dome is alignable with a detent pocket of the second half-ring of detent pockets 117. The pair of connected cantilever arms 151 may be configured to engage the domes 152 with the radial pattern of detent pockets 113. For example, the pair of connected cantilever arms 151 are strong enough to push the domes 152 against the radial pattern of detent pockets 113. In some embodiments, the pair of connected cantilever arms 151 are positioned non-centered relative to the spring plate.

In some embodiments, the spring plate further comprises a compression mechanism 153 that couples the pair of connected cantilevered arms 151 to the spring plate 150 and is configured to engage to the domes 152 with the radial pattern of detent pockets 113. For example, the compression mechanism 153 is strong enough to push the domes 152 against the radial pattern of detent pockets 113. The compression mechanism 153 may be spring-like. For example, the compression mechanism 153 may be as a leaf spring integrated as part of the spring plate. The spring plate being configured as a unitary piece part facilitates a low profile in space constrained areas.

In one embodiment, the pair of connected cantilever arms 151 provides a low profile compression mechanism and the spring plate 150 may be a unitary piece. The pair of connected cantilevered arms 151 may be coplanar with the spring plate 150. The spring plate 150 may further comprise a set of impressions 154 positioned proximal to the pair of connected cantilever arms 151. The set of impressions 154 strengthens the structural integrity of the spring plate 150 near the pair of connected cantilever arms 151.

Figure 4:
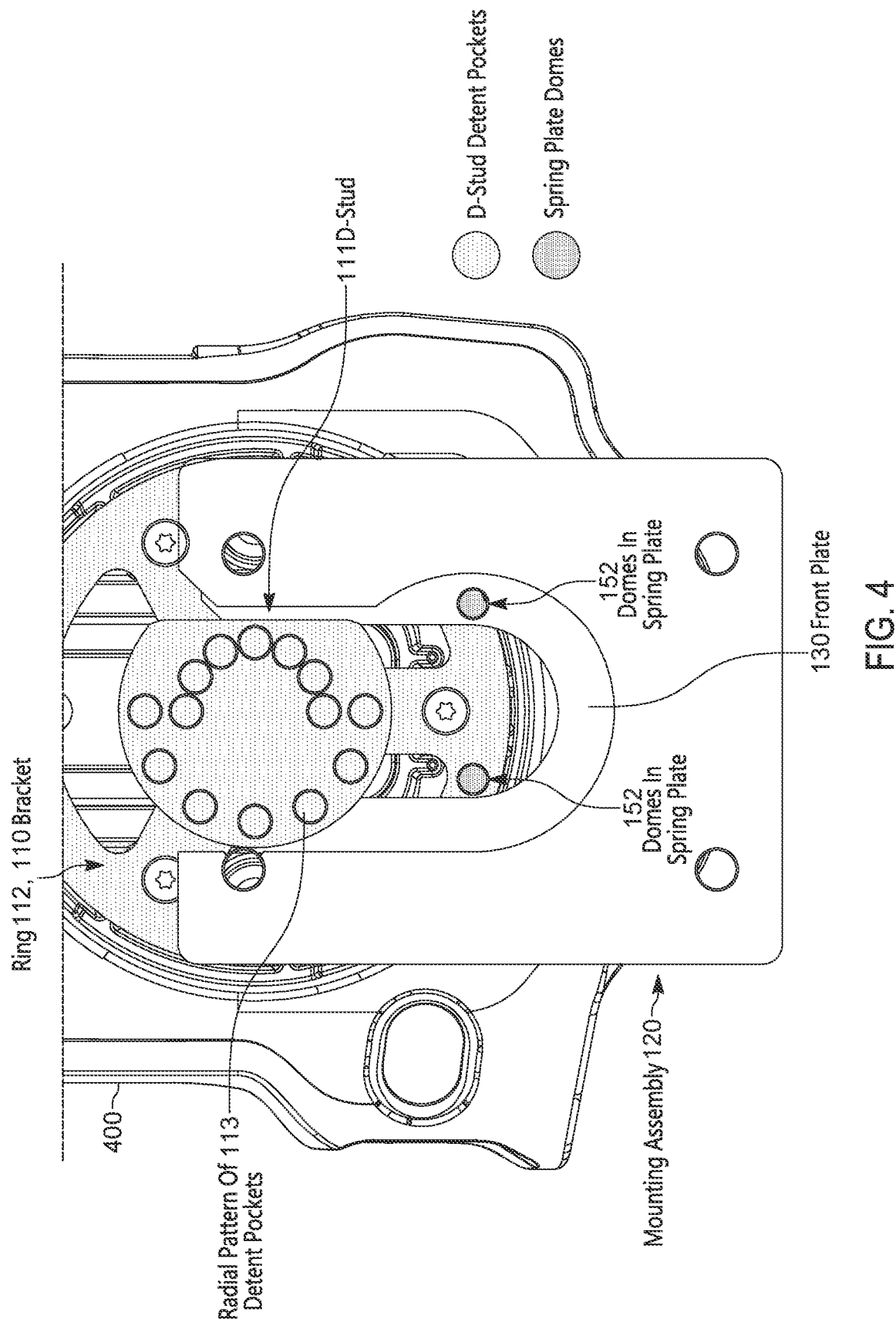
FIG. 4 is a rear view of a cross-section of the mounting apparatus in accordance with some embodiments.

FIGS. 4-7B provide a plurality of cross-sectional views illustrating insertion and rotation of the D-stud 111 within mounting assembly 120 in accordance with some embodiments. FIG. 4 shows D-stud 111 being vertically inserted into the mounting assembly 120 with a holster housing 400 attached to the ring 112 of the bracket 110. The radial pattern of detent pockets 113 are not engaging the domes 152. Instead, one dome 152 is engaging the ring 112 of the bracket 110 while the other dome is engaging the front plate 130. However, in later views, the domes 152 will be shown engaging the radial pattern of detent pockets 113.

Figure 5A:
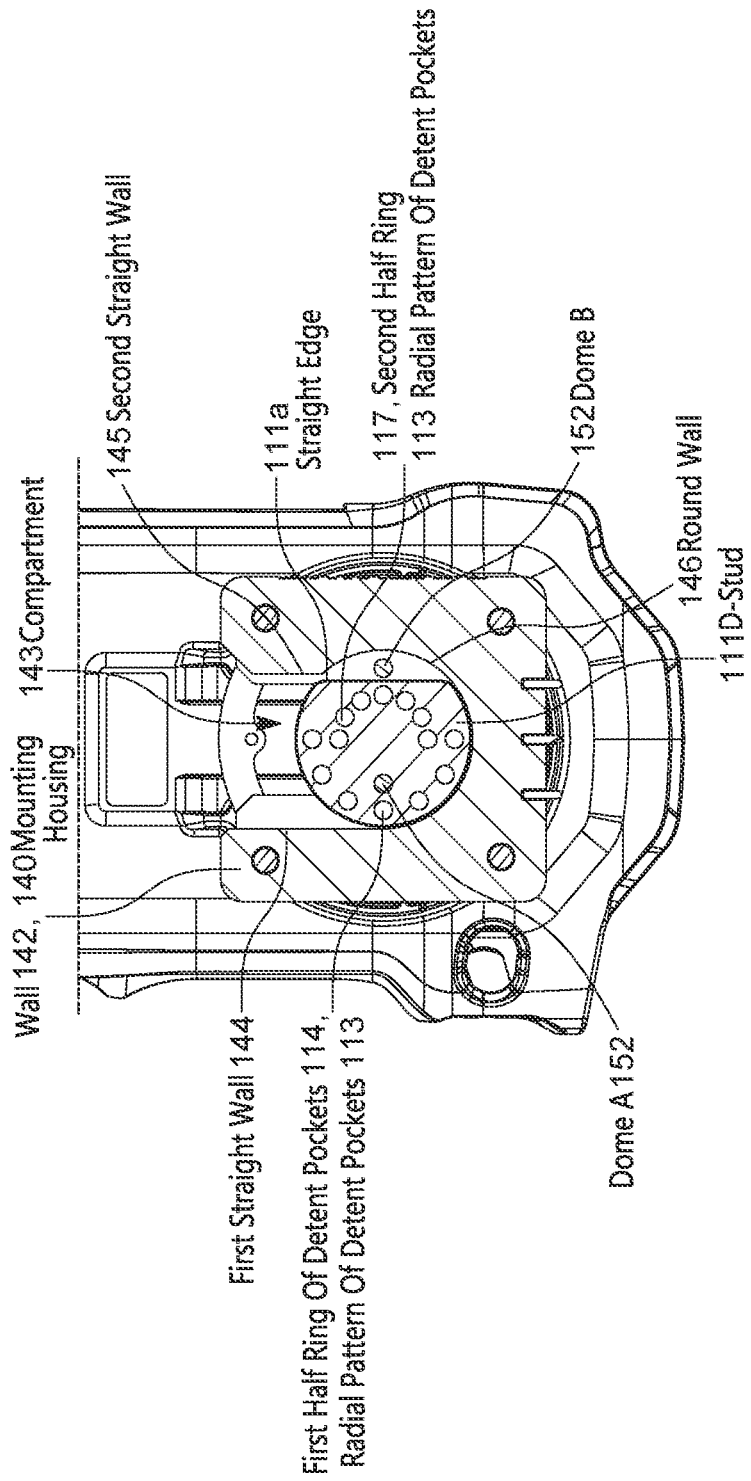
FIG. 5A is rear view of a cross-section of the mounting apparatus with the bracket fully inserted in accordance with some embodiments.

Referring to FIG. 5A, the D-stud 111 has been completely inserted into the compartment 143 of the mounting housing 140. The wall 142 of the mounting housing has a first straight wall 144, a second straight wall 145, and a curved wall 146. The first straight wall 144 and the second straight wall 145 are parallel to each other. Both the first straight wall 144 and the second straight wall are connected to the curved wall 146. The distance between the first straight wall 144 and the second straight wall 145 is smaller than the diameter of the curved wall 146. As a result, the D-stud 111 is vertically insertable into the compartment 143 of the mounting housing 140. More specifically, a straight edge 111a of the D-stud 111 is positioned to be parallel with the first straight wall 144 and the second straight wall 145 for the D-stud 111 to be inserted into the compartment 143.

While the D-stud 111 is in the vertical position, neither dome 152 engages the radial pattern of detent pockets 113. As a result, neither dome 152 engages either the first half-ring of detent pockets 114 or the second half-ring of detent pockets 117. Thus, the D-stud 111 may freely rotate in any either direction while being received by the compartment 143.

Figure 5B:
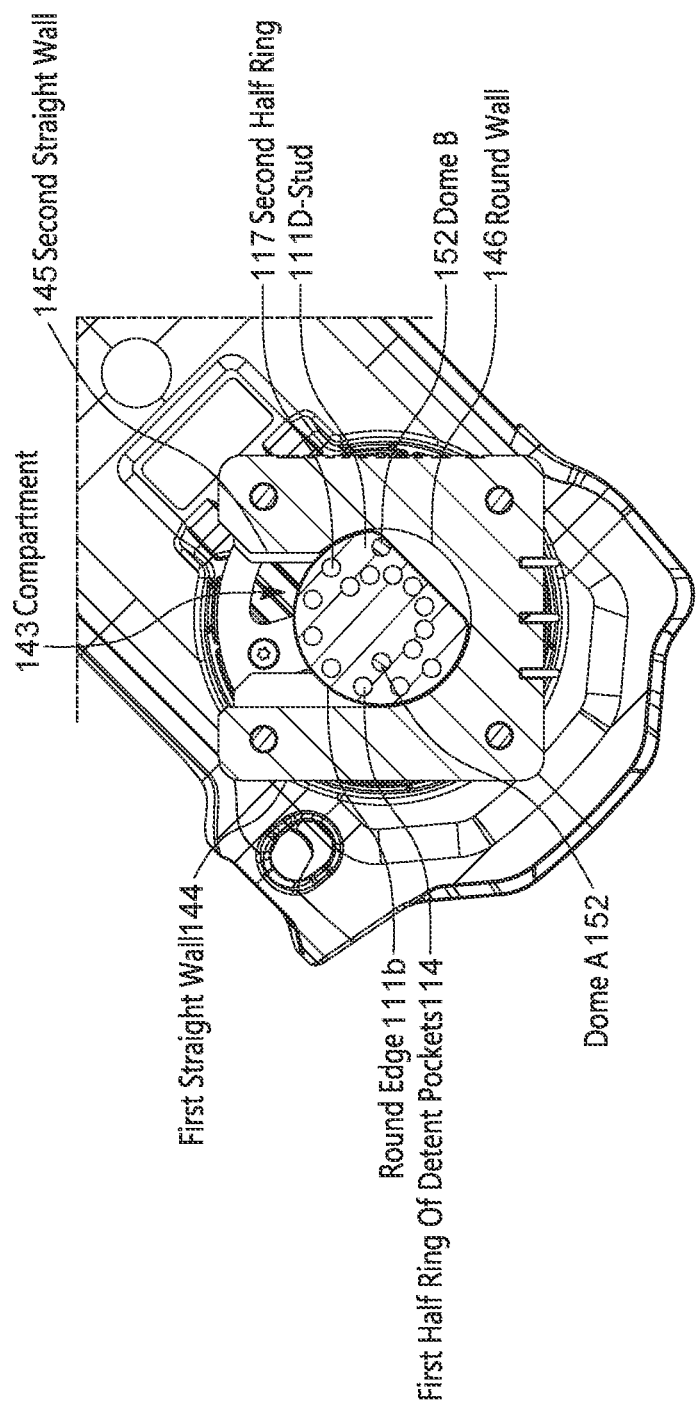
FIG. 5B is a rear view of a cross-section of the mounting apparatus with the D-stud rotated in accordance with some embodiments.

Referring to FIG. 5B, the D-stud 111 has freely rotated in a clockwise direction. The D-stud 111 may freely rotate without accidentally exiting the compartment 143 because the distance between the first straight wall 144 and the second straight wall 145 is smaller than the diameter of a round edge 111b of the D-stud 111. Furthermore, the diameter of the curved wall 146 is substantially similar to the round edge 111b of the D-stud 111, allowing the D-stud 111 to freely rotate. While the D-stud 111 is freely rotating, neither dome 152 is engaging the first half-ring of detent pockets 114 nor the second half-ring of detent pockets 117.

Figure 6A:
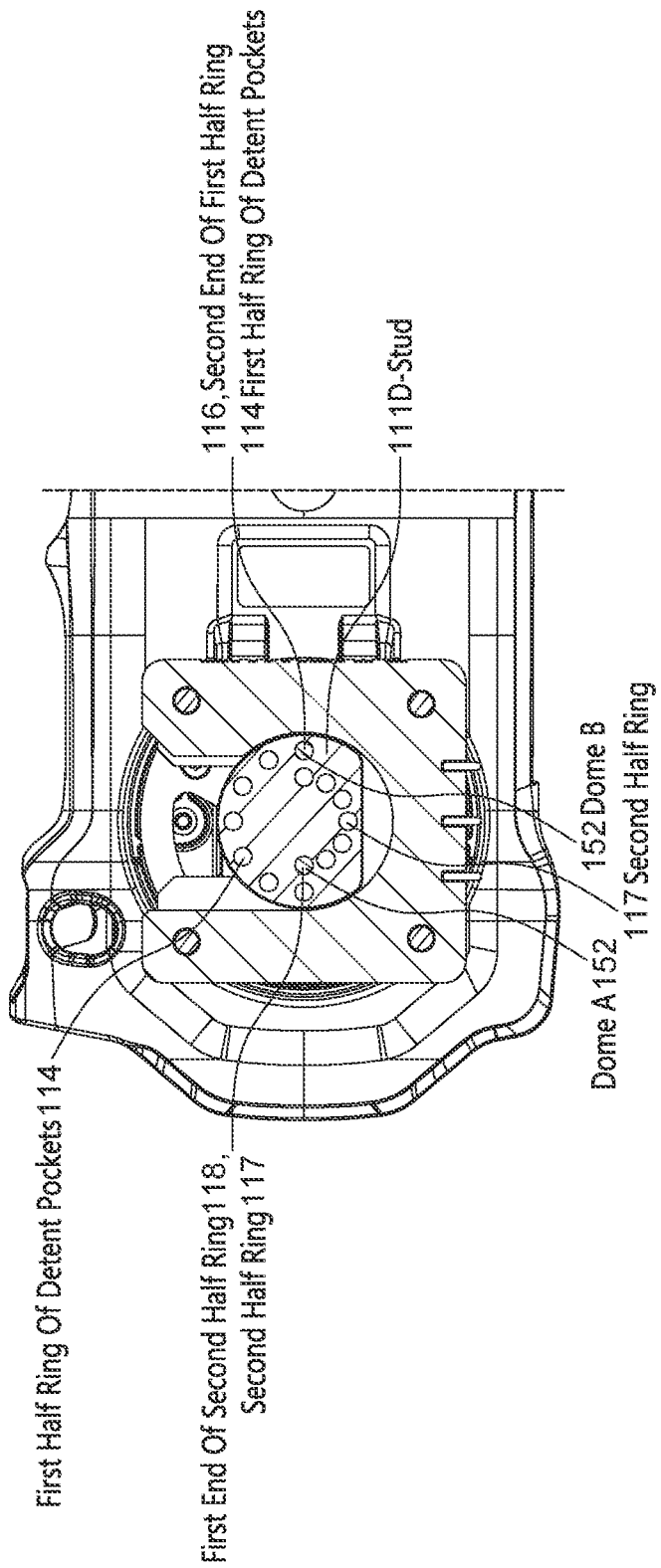
FIG. 6A is a rear view of a cross-section of the mounting apparatus with the D-stud rotated in accordance with some embodiments.

Referring to FIG. 6A, the D-stud 111 has freely rotated to the point that the domes 152 are now engaging the first half-ring of detent pockets 114 and the second half-ring of detent pockets 117. More specifically, one dome 152 engages the second end 116 of the first-half ring of detent pockets 114 and the other dome 152 engages the first end 118 of the second half-ring of detent pockets 117. At this point, the D-stud 111 no longer freely rotates. Instead, the D-stud 111 rotates in a ratcheting manner, with each detent pocket in the first-half ring of detent pockets 114 and the second half-ring of detent pockets 117 corresponding to a rotational increment. In some embodiments, the number of detent pockets in the first half-ring of detent pockets 114 is equal to the second half-ring of detent pockets 117. Furthermore, each detent pocket of the first half-ring 114 may correspond with a detent pocket of the second half-ring 117. For example, the second end 116 of the first half-ring of detent pockets 114 corresponds with the first end 118 of the second half-ring of detent pockets 117.

Figure 6B:
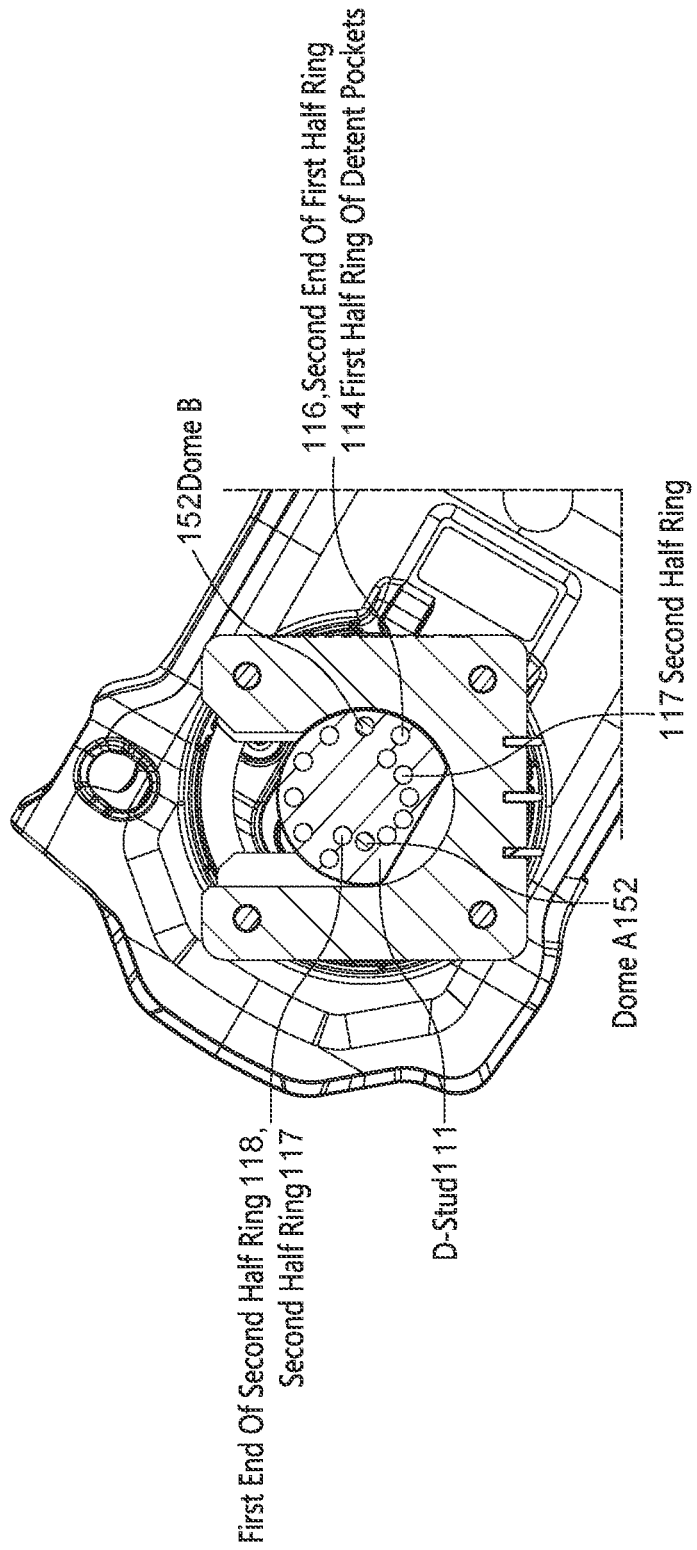
FIG. 6B is a rear view of a cross-section of the mounting apparatus with the D-stud rotated in accordance with some embodiments.

Referring to FIG. 6B, the D-stud 111 has rotated in a ratcheting manner in a clockwise direction. The domes 152 are no longer engaging the second end 116 of the first half-ring of detent pockets 114 and the first end 118 of the second half-ring of detent pockets 117. Instead, the domes 152 are now engaging different detent pockets of the first half-ring of detent pockets 114 and the second half-ring of detent pockets 117. The D-stud 111 may continue to rotate in a ratcheting manner until the domes 152 are no longer aligned with the detent pockets of the first-half ring of detent pockets 114 and the second half-ring of detent pockets 117. As shown later, when the domes 152 are no longer aligned with the detent pockets, the domes have effectively disengaged from the first half-ring 114 and the second half-ring 117. Thus, the D-stud 111 may begin freely rotating again.

Figure 7A:
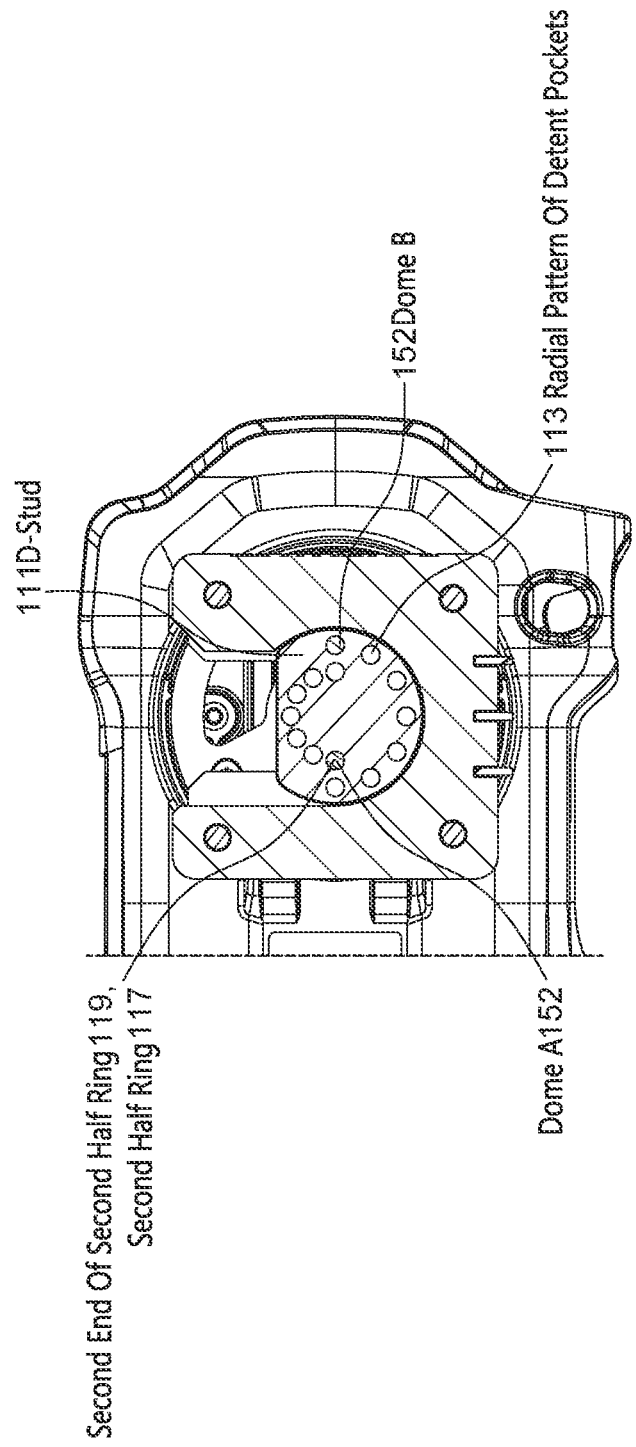
FIG. 7A is a rear view of a cross-section of the mounting apparatus with the D-stud rotated in accordance with some embodiments.

Referring to FIG. 7A, the D-stud 111 has rotated again in the clockwise direction. The domes 152 continue to engage the radial pattern of detent pockets 113. More specifically, the domes 152 are now engaging the first end 115 of the first half-ring of detent pockets and the second end 119 of the second half-ring of detent pockets 117.

Referring now to FIG. 7B, the D-stud 111 has rotated again the clockwise direction. This time, the domes 152 are no longer engaging the radial pattern of detent pockets 113. As a result, the D-stud 111 may rotate freely. In some embodiments, the D-stud 111 may freely rotate under the force of gravity until the domes 152 are again engaging the radial pattern of detent pockets 113. For example, the D-stud 111 in FIG. 5A will naturally rotate either clockwise or counterclockwise from a vertical position when the domes 152 are misaligned with the radial pattern of detent pockets 113 and not engaging the radial pattern of detent pockets 113. The D-stud 111 will stop freely rotating when the domes 152 are engaging the ends of the first-half ring of detent pockets and second half-ring of detent pockets as shown in FIGS. 6A and 7A. Thus, by allowing the D-stud 111 in FIG. 5A to freely rotate until the domes 152 engage the radial pattern of detent pockets 113, the D-stud 111 can provide the bracket 110 with auto-recovery. More specifically, the D-stud 111 can provide the bracket 110 with the ability to automatically recover from the vertical position shown in FIG. 5A to a non-vertical position where the D-stud 111 cannot slide out of the compartment 143. The benefit of auto-recovery is that the D-stud 111 cannot naturally stay in a vertical positon due to gravity. Since the bracket 110 can only be removed from the mounting housing 140 while the D-stud 111 is in a vertical position, the auto-recovery prevents the bracket 110 from accidentally slipping out of the mounting housing 140 by preventing the D-stud 111 from accidentally being in a vertical position. In some embodiments, the D-stud 111 rotates in a ratcheting manner in a first range of motion while the domes 152 are engaging the radial pattern of detent pockets 113 and freely rotates in a second range of motion with the domes 152 disengaged from the radial pattern of detent pockets 113. The first range of motion may be a bottom 180 degrees and the second range of motion may be a top 180 degrees. As previously explained, the second range of motion provides auto-recovery, preventing the D-stud 111 from slipping out of the compartment 143 of the mounting housing 140.

Figure 8:
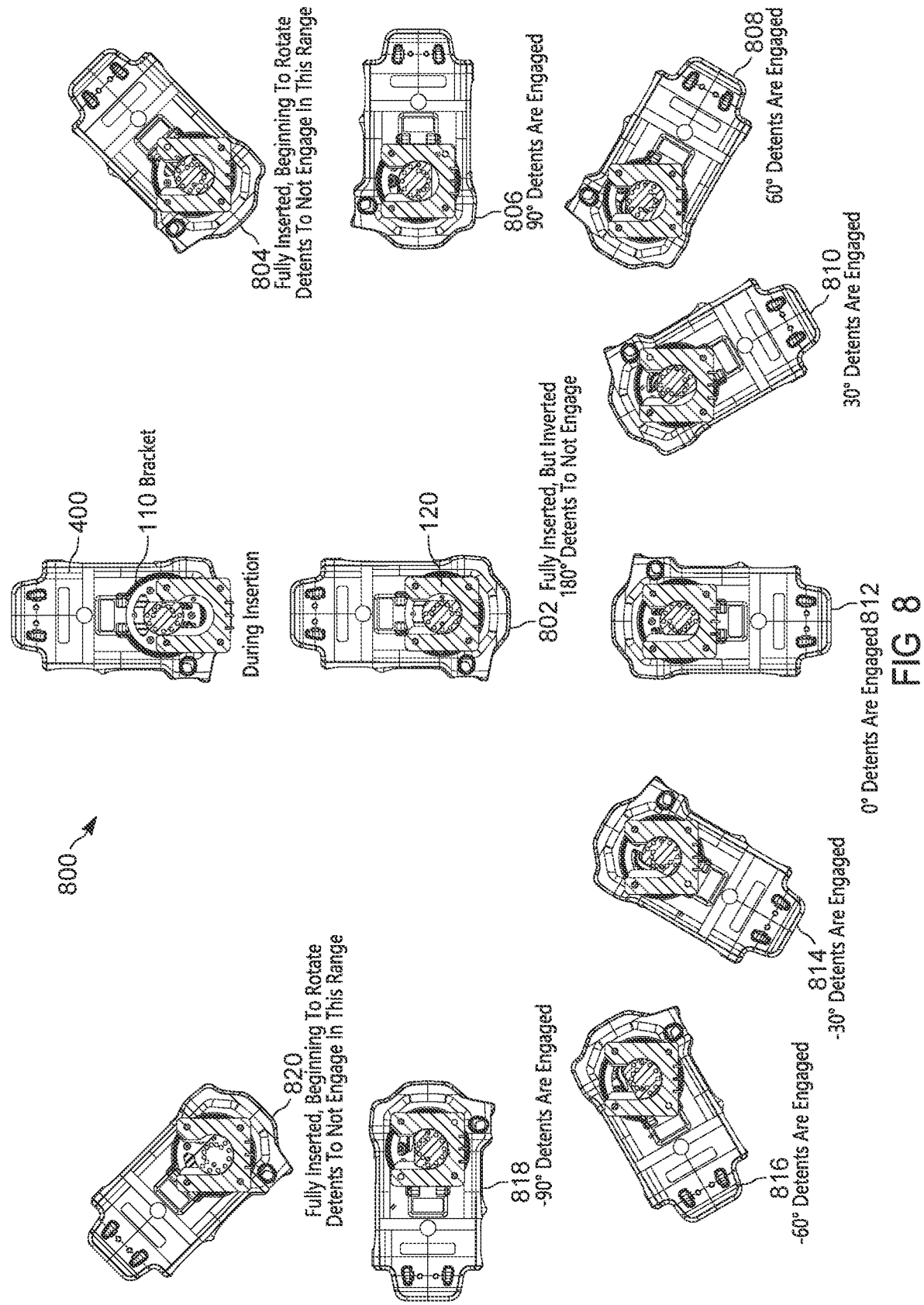
FIG. 8 is a cross-sectional diagram illustrating the rotation of the holster while the holster housing is secured to the mounting apparatus.

FIG. 8 is shows cross-sectional views illustrating the rotation of a holster 800 having a holster housing 400 secured to the bracket 110 in accordance with some embodiments. The holster housing 400 may rotate in a ratcheting manner while the holster housing 400 is rotating in a bottom 180 degrees range and freely rotate while the holster housing 400 is rotating in a top 180 degrees range. As previously mentioned, since the holster housing 400 freely rotates during the top 180 degrees degree range, the holster housing 400 cannot naturally stay in a vertical position and slip out. Thus, if the holster housing 400 is rotating within the top 180 degrees range, the holster housing 400 will automatically recover under the force of gravity to a position in the bottom 180 degrees range. Furthermore, because the holster housing 400 rotates in increments during the bottom 180 degrees range, the holster housing 400 can be rotationally adjusted for the comfort of the wearer.

At view 802, the bracket 110 is vertically inserted into the mounting assembly 120. At this point, the domes are engaging the D-stud but are not aligned with the detent pockets. At view 804, the bracket is freely rotating in a clockwise direction because the domes are not aligned with the detent pockets on the D-stud. At view 806, the bracket has rotated enough that the domes are now aligned with the detent pockets. At views 808-818, the bracket is rotating clockwise in a ratcheting manner with the domes engaging different detent pockets at each view. At view 820, the bracket now freely rotates because the domes are misaligned with the detent pockets. The bracket will not naturally maintain the position shown in view 820 and view 804 because gravity will cause the bracket to rotate into the positions shown in view 806 and 818. Thus, whenever the bracket is rotating between in the top half of motion between the positions in view 806 and 818, the bracket will naturally recover to a ratcheting position, thus enabling auto-recovery.

Figure 9:
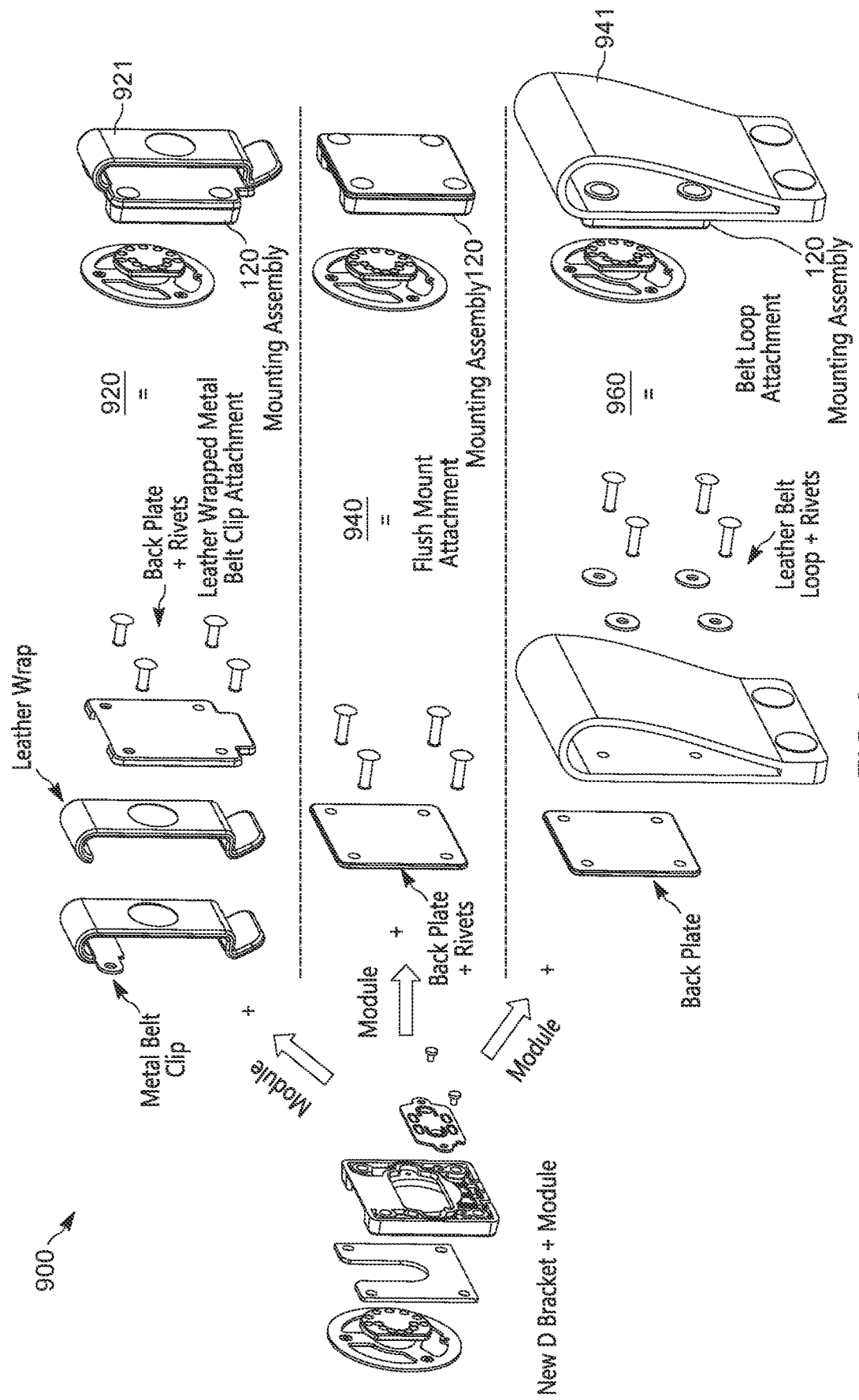
FIG. 9 is an illustration of the different embodiments of the mounting apparatus.

FIG. 9 is a diagram showing different embodiments of the mounting apparatus. In embodiment 920, a belt clip 921 is mounted to the mounting assembly 120. In embodiment 940, the mounting assembly 120 has a flush mount attachment. In embodiment 960, a belt loop 941 is mounted to the mounting assembly 120.

Figure 10:
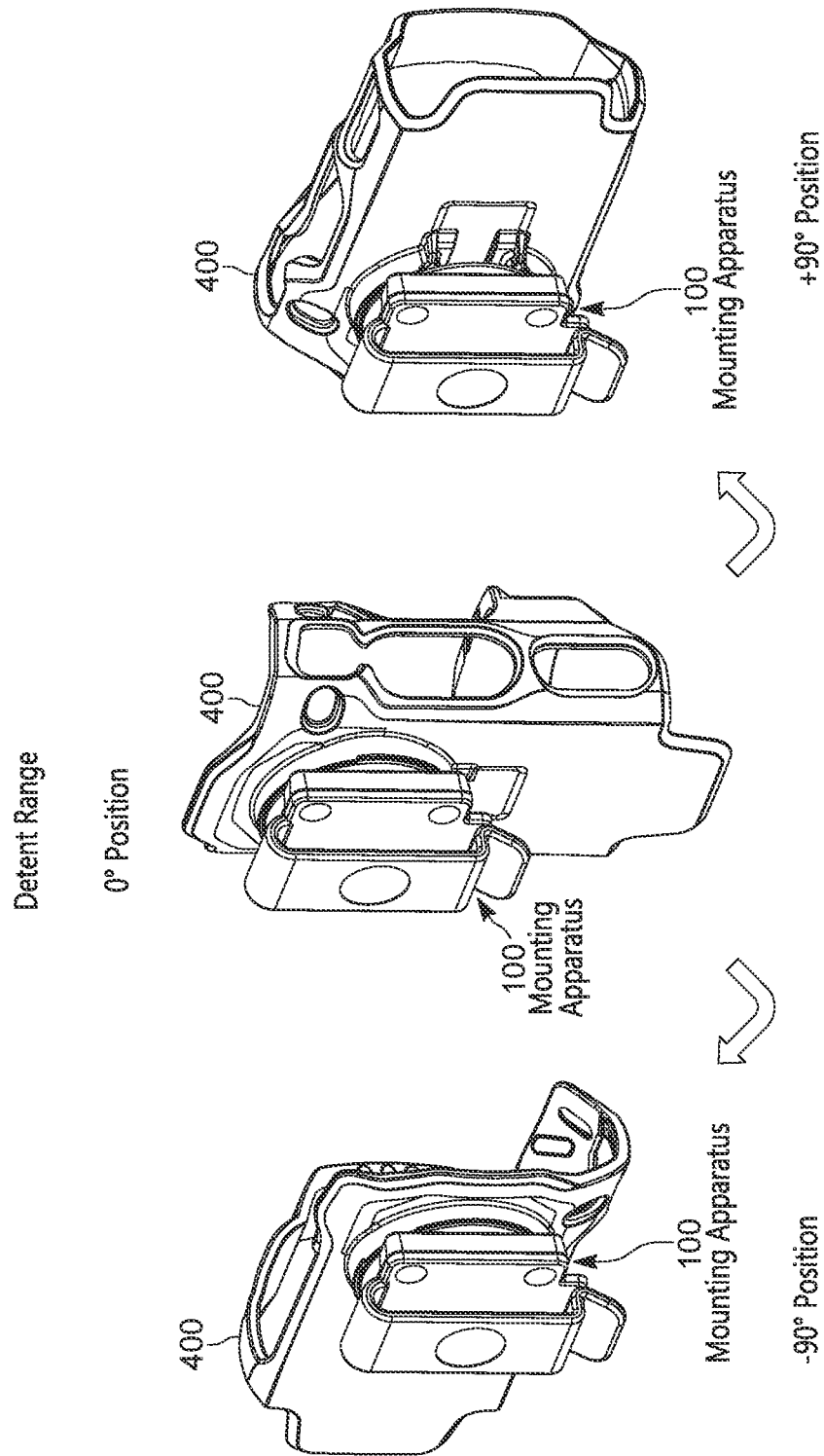
FIG. 10 is a perspective view of the mounting apparatus rotating while attached to the holster in accordance with some embodiments.

Referring to FIG. 10, while the holster housing 400 is mounted to the mounting apparatus 100, the holster housing 400 will naturally rotate from a vertical position in either a clockwise direction to a 90° position or a counter clockwise direction to a 90° position.

Figure 11:
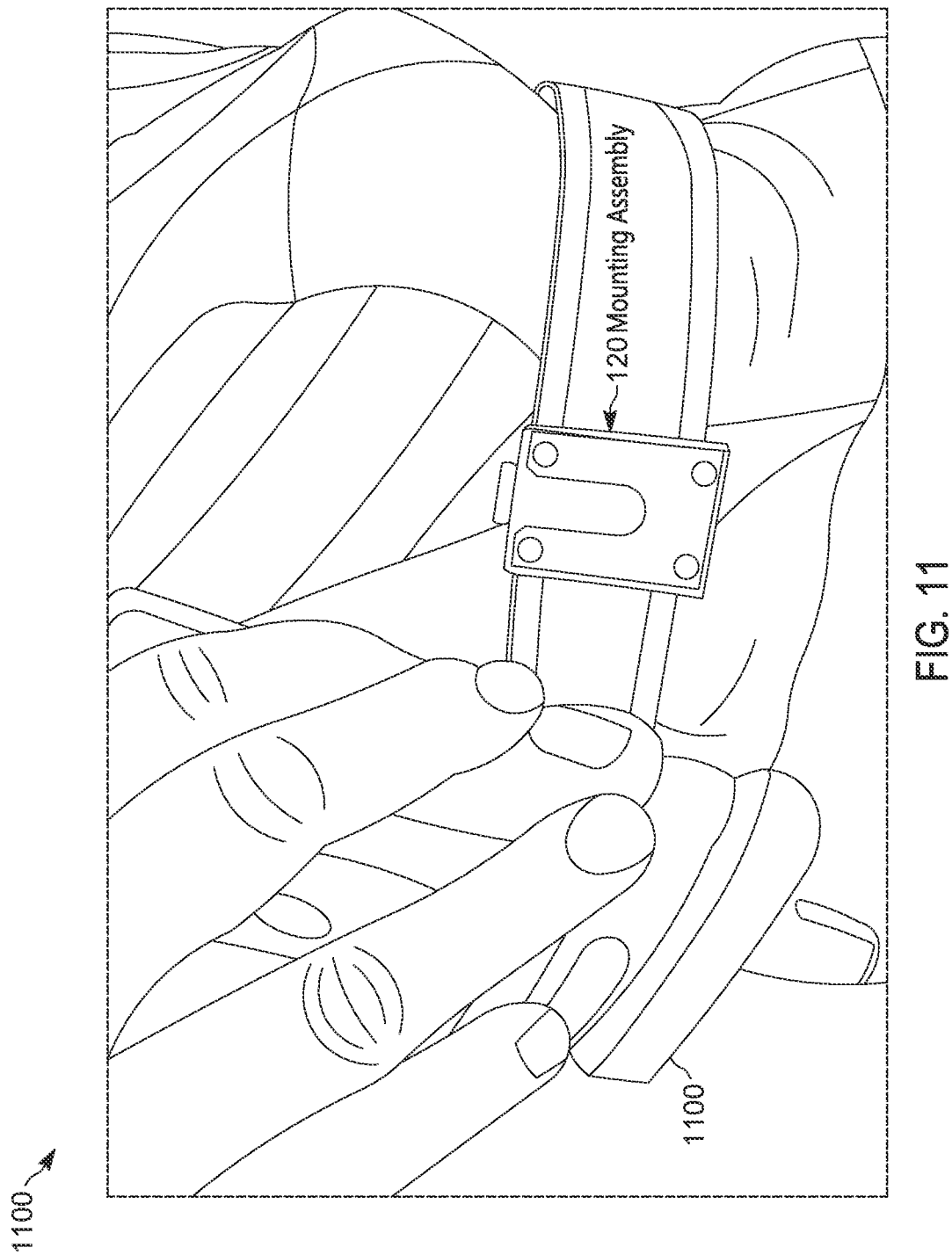
FIG. 11 is an illustration of the portable communication device being inserted into the mounting assembly of the mounting apparatus in accordance with some embodiments.

FIG. 11 illustrates a portable radio 1100 mounted in a holster being inserted into to the mounting assembly 120 of the mounting apparatus. The holstered portable radio 1100, having the D-stud described in previous views, is shown being inserted upside down into the mounting assembly 120.

Public safety personnel, such as those working in law enforcement, will benefit from the mobility, comfort, safety, and accessibility provided by the holstered radio with D-stud configuration inserted into the mounting assembly as described by the various embodiments. The bracket with patterned D-stud inserted into the mounting assembly allows for configurable user wearability, such as sitting and standing positions of the user.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A holster (800), comprising:
a holster housing (400); and
a bracket secured to the holster housing, the bracket having a D-stud extending therefrom, the D-stud having a radial pattern (113) of a first half-ring of detents (114) and a second half-ring of detents (117), the first half-ring (114) having a larger radius than the second half-ring (117) and sharing a center point with the second half-ring (117), the first half-ring (114) having a first end (115) and a second end (116), and the second half-ring (117) having a first end (118) and a second end (119), the first end (115) of the first half-ring (114) overlapping with the first end (118) of the second half-ring (117), the second end (116) of the first half-ring (114) overlapping with the second end (119) of the second half-ring (117), wherein the first half-ring (114) has an opening that faces an opening of the second half ring (117).

2. The holster of claim 1, wherein the detents are formed of pockets.

3. The holster of claim 1, wherein the detents are formed of domes.

4. The holster of claim 1, wherein each detent of the first half-ring (114) corresponds with a detent of the second half-ring (117).

5. The holster of claim 1, wherein the D-stud has a straight edge and a round edge, and the first half-ring (114) is proximal to the round edge of the D-stud (111), and the second half-ring (117) is proximal to the straight edge of the D-stud (111).

6. A mounting apparatus, comprising:
a bracket (110) having a D-stud (111) extending therefrom, the D-stud (111) having a radial pattern of detents (113) formed of a first half-ring of detents (114) and a second half-ring of detents (117), the first half-ring of detents (114) having a larger radius than the second half-ring (117) and sharing a center point with the second half-ring (117); and
a mounting assembly (120) configured to receive the bracket (110), the mounting assembly (120) comprising:
a front plate (130) having a cutout for receiving the D-stud;
a mounting housing (140) having an aperture (141); and
a spring plate (150) mounted within the aperture (141) of the mounting housing (140), the spring plate (150) comprising a pair of connected cantilever arms (151), each arm (151) having a dome (152), wherein the D-stud (111) rotates in a first range of motion when domes (152) and detents (113) are aligned, and the D-stud (111) rotates in a second range of motion when the domes (152) and detents (113) are misaligned thereby providing auto-recovery to a position where the D-stud cannot slide out of the cutout.

7. The mounting apparatus of claim 6, wherein the D-stud (111) rotates in a ratcheting manner in the first range of motion while the domes (152) engage to the radial pattern of detents (113), and the D-stud (111) freely rotates in a second range of motion when the domes (152) are disengaged from the radial pattern of detents (113).

8. A mounting apparatus (100) for a portable communication device, the mounting apparatus comprising:
a bracket (110) mounted to a radio holster, the bracket (110) comprising:
a D-stud (111) extending therefrom, the D-stud (111) having a radial pattern (113) of a first half-ring of detent pockets (114) and a second half-ring of detent pockets (117), the first half-ring (114) having a larger radius than the second half-ring (117) and sharing a center point with the second half-ring (117), the first half-ring (114) having a first end (115) and a second end (116), and the second half-ring (117) having a first end (118) and a second end (119), the first end (115) of the first half-ring (114) overlapping with the first end (118) of the second half-ring (117), the second end (116) of the first half-ring (114) overlapping with the second end (119) of the second half-ring (117), wherein the first half-ring (114) has an opening that faces an opening of the second half ring (117); and
a mounting assembly (120) configured to receive the bracket (110), the mounting assembly (120) comprising:
a front plate (130) having a u-shaped cutout for receiving the D-stud;
a mounting housing (140) having an aperture (141); and
a spring plate (150) mounted within the aperture (141) of the mounting housing (140), the spring plate (150) comprising:
a pair of connected cantilever arms (151) compressibly coupled with the spring plate, each arm (151) having a dome (152), the pair of connected cantilever arms (151) positioned such that at least one dome (152) is alignable with a detent pocket of the first half-ring (114) and another dome (152) is alignable with a detent pocket with the second half ring (117), wherein the bracket (110) is rotatable within the mounting assembly (120), and wherein the D-stud (111) rotates in a first range of motion when domes (152) and detent pockets (113) are aligned, and the D-stud (111) rotates in a second range of motion when the domes (152) and detent pockets (113) are misaligned providing auto-recovery, wherein the pair of connected cantilever arms (151) is configured to engage the domes (152) with the pattern of detent pockets.

9. The mounting apparatus of claim 8, wherein the pair of connected cantilever arms (151) provides a low profile compression mechanism (153).

10. The mounting apparatus of claim 9, wherein the compression mechanism (153) is at least one leaf spring.

11. The mounting apparatus of claim 10, wherein the spring plate (150) is a unitary piece.

12. The mounting apparatus of claim 8, wherein the pair of connected cantilever arms (151) is non-centered relative to the spring plate.

13. The mounting apparatus of claim 12, wherein each cantilever arm (151) is equal in length.

14. The mounting apparatus of claim 8, wherein the D-stud (111) has a straight edge (111a) and a round edge (111b), and the first half-ring (114) is proximal to the round edge of the D-stud, and the second half-ring (117) is proximal to the straight edge of the D-stud.

15. The mounting apparatus of claim 8, wherein each detent pocket of the first half-ring (114) corresponds to a detent pocket of the second half-ring (117).

16. The mounting apparatus of claim 8, wherein the detent pockets of the radial pattern of detent pockets 113 are identical in size.

17. The mounting apparatus of claim 8, wherein the front plate (130) is made of metal.

18. The mounting apparatus of claim 8, wherein the D-stud (111) and the domes (152) are made of metal.

19. The mounting apparatus of claim 8, wherein the first range of motion and the second range of motion are both 180 degrees.

20. A mounting apparatus (100) for a portable communication device, the mounting apparatus comprising:
- a bracket (110) mounted to a radio holster, the bracket (110) comprising:
  - a D-stud (111) extending therefrom, the D-stud (111) having a radial pattern (113) of a first half-ring of detent pockets (114) and a second half-ring of detent pockets (117), the first half-ring (114) having a larger radius than the second half-ring (117) and sharing a center point with the second half-ring (117), the first half-ring (114) having a first end (115) and a second end (116), and the second half-ring (117) having a first end (118) and a second end (119), the first end (115) of the first half-ring (114) overlapping with the first end (118) of the second half-ring (117), the second end (116) of the first half-ring (114) overlapping with the second end (119) of the second half-ring (117), wherein the first half-ring (114) has an opening that faces an opening of the second half ring (117); and
- a mounting assembly (120) configured to receive the bracket (110), the mounting assembly (120) comprising:
- a front plate (130) having a u-shaped cutout for receiving the D-stud;
- a mounting housing (140) having an aperture (141); and
- a spring plate (150) mounted within the aperture (141) of the mounting housing (140), the spring plate (150) comprising:
  - a pair of connected cantilever arms (151) compressibly coupled to the spring plate, each arm (151) having a dome (152), the pair of connected cantilever arms (151) positioned such that at least one dome (152) is alignable with a detent pocket of the first half-ring (114) and another dome (152) is alignable with a detent pocket with the second half ring (117), wherein the bracket (110) is rotatable within the mounting assembly (120), and wherein the D-stud (111) rotates in a first range of motion when domes (152) and detent pockets (113) are aligned, and the D-stud (111) rotates in a second range of motion when the domes (152) and detent pockets (113) are misaligned providing auto-recovery, wherein the pair of connected cantilever arms (151) is configured to engage the domes (152) with the radial pattern of detent pockets (113), wherein the pair of connected cantilever arms (151) provides a low profile compression mechanism (153) and the compression mechanism (153) is at least one leaf spring, wherein the spring plate (150) is a unitary piece, wherein the first half-ring (114) is proximal to a round edge (111b) of the D-stud (111) and the second half-ring (117) is proximal to a straight edge (111a) of the D-stud (111).

21. The mounting apparatus of claim 20, wherein the pair of connected cantilever arms (151) is non-centered relative to the spring plate.

22. The mounting apparatus of claim 21, wherein each cantilever arm (151) is equal in length.

* * * * *